United States Patent [19]

Ozawa

[11] Patent Number: 4,779,148
[45] Date of Patent: Oct. 18, 1988

[54] SYSTEM AND METHOD FOR DETECTING DEVIATIONS IN THE POSITIONING OF A HEAD RELATIVE TO A TRACK ON THE DISC OF A DISC STORAGE UNIT WHEREIN THE UNIT GENERATES A RAMP SIGNAL HAVING A GRADIENT DETERMINED BY THE POSITION OF THE TRACK ON THE DISC

[75] Inventor: Hiromi Ozawa, Kawasaki, Japan

[73] Assignee: Fuji Electric Company Ltd., Kanagawa, Japan

[21] Appl. No.: 4,581

[22] Filed: Jan. 20, 1987

[30] Foreign Application Priority Data

Jan. 21, 1986 [JP] Japan .................................. 61-10630

[51] Int. Cl.$^4$ ........................ G11B 5/596; G11B 21/10
[52] U.S. Cl. ...................................................... 360/77
[58] Field of Search ............................. 360/77, 78, 65

[56] References Cited

U.S. PATENT DOCUMENTS 4,530,019  7/1985  Penniman ............................. 360/77
4,564,869  1/1986  Baumeister ........................... 360/65
4,745,497  5/1988  Ozawa .................................. 360/77

FOREIGN PATENT DOCUMENTS

0145962  6/1985  European Pat. Off. ............. 360/77

Primary Examiner—Raymond F. Cardillo
Assistant Examiner—David L. Robertson
Attorney, Agent, or Firm—Spencer & Frank

[57] ABSTRACT

A system for detecting an off-track amount of a present head position with respect to a normal position of a desired track on a disc in a disc storage unit in which a closed loop control is employed to control the position of a magnetic head. A repetitive pattern is stored as reference information in each reference information region on the disc in such a way that it is deviated in the longitudinal direction of a track from the repetitive patterns stored in the adjacent regions. When the reference information in the two adjacent regions is read out by the head, a ramp signal whose gradient is varied in accordance with the position of a desired track is generated in synchronism with the readout of the reference information. The ramp signal is used as a threshold value and the numbers of the repetitive pattern signals obtained from the signals read out from the reference information in the two adjacent regions which are in excess of the threshold value is counted. Then, in accordance with the difference between the two counted values thus obtained from the two regions, an off-track amount of the head position from the normal position of a desired track is detected.

14 Claims, 5 Drawing Sheets

SYSTEM AND METHOD FOR DETECTING DEVIATIONS IN THE POSITIONING OF A HEAD RELATIVE TO A TRACK ON THE DISC OF A DISC STORAGE UNIT WHEREIN THE UNIT GENERATES A RAMP SIGNAL HAVING A GRADIENT DETERMINED BY THE POSITION OF THE TRACK ON THE DISC

BACKGROUND OF THE INVENTION

1. Field of the Invention

The present invention relates to a system for detecting an off-track amount of a present head position with respect to the normal position of a desired track in a disc storage unit and especially in a hard disc storage unit of the type in which a so-called closed loop control is employed to control the position of an information read/write transducer such as a magnetic head.

2. Description of the Prior Art

A hard disc unit which typically represents a disc storage unit of the type described above is provided with one or more magnetic discs as media for storing information as is well known in the art and these discs are rotated normally at a high rotational speed on the order of thousands of r.p.m. by a spindle motor. Each disc has a plurality of concentric tracks for storing information. In order to write in and read out information to and from a surface of the disc respectively, one read/write head is assigned to each disc surface and is properly positioned on a desired track of a plurality of tracks and in principle is positioned at the center of the desired track.

There has been an increasing demand for a disc storage unit which is compact in size and yet capable of storing information at a high data storage density. That is, the diameter of the disc is reduced, while the data storage density is greatly increased.

In the case of a relatively low data storage density, an open loop control has long been used to control the position of the read/write head. According to this control system, only a predetermined number of drive command pulses are applied to an actuator such as a pulse motor for rotating the read/write head, so that the head is moved toward a track of a selected number, but the actual position of the read/write head is not detected. As a result, a fine adjustment of the position of the read/write head is not accomplished. It has been reported that the maximum number of tracks which can be selected by such an open loop control system is 500 TPI (track per inch), for example, in the case of a hard disc of 5.25 inches in diameter.

If the data storage density is increased and exceeds 700 TPI, it is required to employ a closed loop system in order to control the position of the read/write head. A closed loop control system is based upon correct detection of the position of the read/write head, and hence various devices have been made for such a detection. In principle, the most correct and simplest manner of head position detection is such that instead of mounting a special position sensor on the read/write head, reference information for detecting the position of the read/write head is previously written into a disc and is read out by the read/write head itself whose position is to be detected, so that the position of the read/write head is detected in response to the read out reference information.

A closed loop control system of the type described above is disclosed in detail in, for instance, Japanese Patent Application Laying-open No. 50-99709. In the prior art closed loop control system of the type described above, a reference information pattern to be recorded on the disc or a method for processing the read out reference information has been devised, but in these cases there is a common defect in that a complicated and highly sophisticated signal processing circuit is required to detect the position of the read/write head.

More particularly, according to a closed loop control system of the type described above, reference information is in the form of a magnetic pattern of N and S poles, which is written in such a way that boundaries between the N and S poles are displaced from each other between adjacent reference information. Adjacent reference information data are distinguished from each other by utilizing the deviation between pulse generating timings in a plurality of groups each consisting of a plurality of analog pulses which have their peak values at the boundaries between N and N poles in signals read out by the read/write head. In response to the difference in peak values between the analog pulses, the off-track amount between the present position of the read/write head and the correct position thereof is detected.

It follows, therefore, that reference information must be written into a disc with a high degree of accuracy so that analog pulses which belong to different reference information areas can be distinctly and sharply separated from each other. Furthermore, the peak values of analog pulses belonging to adjacent reference information areas must be temporarily and correctly stored in an analog manner in a peak hold circuit and then their difference must be detected correctly. As a result, a highly sophisticated analog-value peak-hold circuit and a highly sophisticated arithmetic circuit must be employed and it is unavoidable that their associated circuits become complicated.

At an initial stage where such a closed control system inclusive of the type described above is introduced, the position of the read/write head is always controlled, while the head is reading or writing specific information from or in a surface of the disc, so that the region for reference information which is used for the detection of the read/write head must be arranged in parallel with a region for intrinsic information to be read out or written in by the head. As a consequence, at least one surface of the disc is used for storing reference information.

However, it has been found out that when the disc rotates at a high rotational speed, the above-described parallel control is not necessarily needed and that when the position of the read/write head is correctly controlled only once at every rotation of the disc, the correct positioning condition can be properly maintained. As a result, the region on the disc required for the storage of reference information can be reduced in area, so that it now becomes possible to store reference information on the surface of the disc upon which actual data information is stored; that is, on the so-called data surface of the disc. In this case, the reference information regions must be inserted into data information regions, and hence it is better that the reference information regions be reduced in area in order to attain a high data storage density.

However, in the case of the prior art closed loop control system of the type described, in order to correctly evaluate the peak values of respective analog pulses by separating the analog pulses resulting from the reading of reference information, domains which are magnetized in the N and S poles cannot be reduced in area below a certain limited area. Furthermore, in general, reference information must be repeatedly stored. Therefore, each reference information storage region must be considerably extended.

SUMMARY OF THE INVENTION

In view of the above, the primary object of the present invention is to provide a system for detecting an off-track amount of the head position in a disc storage unit in which a processing circuit for processing reference information read out through a read/write head can be simplified in construction and the off-track amount of the read/write head position can be detected with a high degree of accuracy.

Another object of the present invention is to provide a system for detecting an off-track amount of a head position in a disc storage unit in which reference information is written in the disc in a simple manner and without requiring a high degree of accuracy, in and which the area of regions on the surface of the disc required for the storage of reference information is reduced much as is practically possible.

A further object of the present invention is to provide a system for detecting an off-track amount of a head position in a disc storage unit in which the off-track amount of the read/write head position is determined with a high degree of accuracy without being adversely affected according to the radial positions of the surface ot the disc at which reference information is stored.

In order to accomplish the foregoing and other objects and ends, according to the present invention, a repetitive pattern is stored as reference information in each region in such a way that it is deviated in the longitudinal direction of a track from the repetitive patterns stored in the adjacent regions. When the reference information in the two adjacent regions is read out by the read/write head, a ramp signal whose gradient is varied depending upon the position of the desired track on the surface of the disc is generated in synchronism with the readout of the reference information. The ramp signal is used as a threshold value and the numbers of the repetitive pattern signals obtained from the signals read out from the reference information in the two adjacent regions which are in excess of the threshold value is counted. Then, in accordance with the difference between two counted values thus obtained from the two regions, the off-track amount of the read/write head position from the normal position of the desired track is detected.

According to the present invention, each reference information may be in the form of a very simple repetition of N and S poles or "ON" and "OFF" pulses. In this case, the repetition rate can be shortened, so that reference information having a repetition rate of about 100 can be stored in a narrow region to improve the accuracy of the detection of the read/write head. Reference information data stored in the two adjacent regions are deviated from each other in the longitudinal direction of a track, so that the read out signals obtained from the two adjacent regions by the read/write head can be distinctly separated in time and consequently the mutual separation is extremely simple and correct. The ramp-shaped threshold signal which is generated in synchronism with the readout of the reference information must have a correct waveform, but after the comparison of the threshold signal with the read out reference information in a comparator, the pulse signals which correspond to the repetitive pattern in the read out signal and which are in excess of the threshold value are generated in the digital form of a count pulse. Therefore, the detection is not adversely affected by the waveform details. Furthermore, the evaluation can be obtained only by counting the count pulses, so that no error occurs and the circuit can be considerably simplified.

There exists, however, one problem which adversely affects an improvement of the accuracy of the above-described digitalization. That is, the magnitude of the read out signal varies depending upon the radial positions on the surface of the disc at which reference information is stored. As is easily understood, the level of the read out signal is higher when the reference information is stored in the radially outward region of the disc and is lower when the reference information is stored in the radially inward region. When the level varies over a wide range, the number of count pulses obtained by the comparison of the read out signal with the ramp signal varies.

Of course, it is possible to maintain the level of the read out signal at a predetermined level in a simple manner by using a conventional automatic gain control circuit (AGC). However, the AGC circuit is not suitable for control of the read out reference information signal in the present invention. That is, as described above, the positions of the adjacent reference information regions on the surface of the disc are deviated from each other in the longitudinal direction in the present invention. As a result, the portions in the read out signal corresponding to the adjacent reference information regions are separated from each other in time. Consequently, as the response speed is increased by increasing the control gain in order to improve the controllability of the AGC circuit, the levels of the read out signals which are separated in time are averaged.

As described above, the underlying principle of the system for detecting an off-track amount of a head position in the present invention is based on the fact that the detection of the position of the read/write head can be accomplished in response to a difference in level between the read out signals which occur separately. It follows, therefore, that if the levels of the read out signals are averaged so that their difference is reduced, it becomes impossible to control the position of the read/write head. In other words, the above-described feature of the present invention that the signals read out from the adjacent reference information regions are separated from each other has a negative effect on the compensation for the dependence of the level of the read out signal on the radial position of the reference information.

Therefore, in accordance with the present invention, the gradient of the ramp-shaped signal is varied in accordance with the regions in which the reference information is stored; that is, the position in the radial direction on the surface of the disc from which the reference information is read out. As a result, the abovedescribed contradiction can be solved, so that regardless of the position of a track on the surface of the disc, an off-track amount can be detected with a high degree of accuracy.

In the first aspect of the present invention, there is provided a system for detecting an off-track amount of a head position in a disc storage unit in which information is written into and/or read out from a plurality of recording tracks defined on a surface of a disc as a recording medium by a movable transducer head, and repetitive pattern signals, which are deviated from each other in the longitudinal direction of the tracks in adjacent reference information regions, and which are written into regions corresponding to the plurality of tracks as reference information, respectively, of the disc are read out by the head, so that an off-track amount of the present position of the head from the normal position of a desired track is detected, comprising:

means for reading out two repetitive pattern signals from two adjacent reference information regions by the head;

means for generating a ramp-shaped signal in synchronism with a timing signal such that the repetitive pattern signals are read out;

means for varying a gradient of the ramp-shaped signal in accordance with the position of the desired track on the surface of the disc;

means for comparing the two repetitive pattern signals read out from the two adjacent reference information regions with the ramp-shaped signal as a threshold signal value to obtain two repetitive pattern signals which cross the threshold value;

means for counting the numbers of the two repetitive pattern signals which cross the threshold value;

means for obtaining the difference between counted numbers of the repetitive pattern signals crossing the threshold value; and means for obtaining an off-track amount of a position of the head from the desired track in response to the difference between the counted numbers.

Here, the ramp-shaped signal may vary linearly between the leading edge and the center of the reference information region and may vary linearly in the opposite direction between the center and the trailing edge thereof.

The ramp-shaped signal may have a sawtooth wave form which varies in the same manner between the leading edge and the center of the reference information region and between the center and the trailing edge thereof.

A system according to the present invention may further comprise means for generating index pulses for attaining the synchronization for writing and/or reading information onto and/or from the disc, so that in response to the index pulses, the timing for generating the ramp-shaped signal is determined.

A system according to the present invention may further comprise a counter which is reset in response to the index pulses to count clock pulses, the timing being determined in response to an output from the counter.

The counting means and the means for obtaining the difference may be formed by an up/down counter.

A system according to the present invention may further comprise means for generating index pulses for attaining the synchronization for writing and/or reading information onto and/or from the disc, so that in response to the index pulses, the up/down counter is reset; and a counter which is reset in response to the index pulses to count clock pulses, and wherein in response to the output from the counter, the counting direction of the up/down counter is selected and the up/down counter counts the comparison outputs from the comparing means.

The time gradient of the ramp-shaped signal may be varied stepwise and/or continuously in accordance with the position of a track.

In the second aspect of the present invention, there is provided a method for detecting an off-track amount of a head position in a disc storage unit in which information is written into and/or read out from a plurality of recording tracks defined on a surface of a disc as a recording medium by a movable transducer head, and reference information written into regions corresponding to the plurality of tracks, respectively, of the disc are read out by the head, so that an off-track amount of the present position of the head from the normal position of a desired track is detected, and the method comprises the steps of:

writing, as the reference information, a repetitive pattern in each of the reference information regions in such a way that the repetitive patterns are deviated from each other in the longitudinal direction of the tracks in adjacent reference information regions;

generating a ramp-shaped signal whose gradient is varied in accordance with the position of a desired track on the surface of the disc in synchronism with reading of the reference information from the two adjacent reference information regions by the head;

counting the numbers of the repetitive pattern signals which are read out from the two adjacent reference information regions and which cross the ramp-shaped signal as a threshold value; and detecting an off-track amount of a position of the head in relation to a desired track in accordance with the difference between counted numbers of the repetitive pattern signals crossing the threshold value.

Here, the ramp-shaped signal may vary linearly between the leading edge and the center of the reference information region and may vary linearly in the opposite direction between the center and the trailing edge thereof.

The ramp-shaped signal may have a sawtooth wave form which varies in the same manner between the leading edge and the center of the reference information region and between the center and the trailing edge thereof.

The gradient of the ramp-shaped signal may be varied stepwise and/or continuously in accordance with the n position of a track.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

According to the present invention, there is provided a variable ramp generator, in which the gradient of the ramp signal is varied depending upon the regions in which the reference information is stored; that is, depending upon the radial position on the surface of the disc from which the reference information is read out, so that an off-track amount can be detected with an extremely high degree of accuracy regardless of the position of a track on the surface of the disc.

Figure 1:
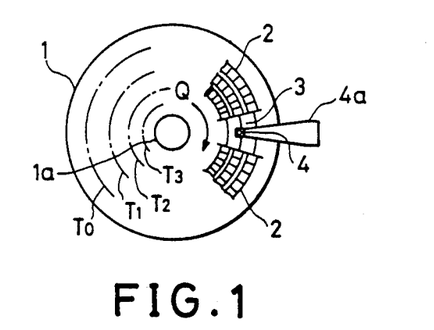
FIG. 1 is a plan view showing a read/write head and a disc.
Figure 2:
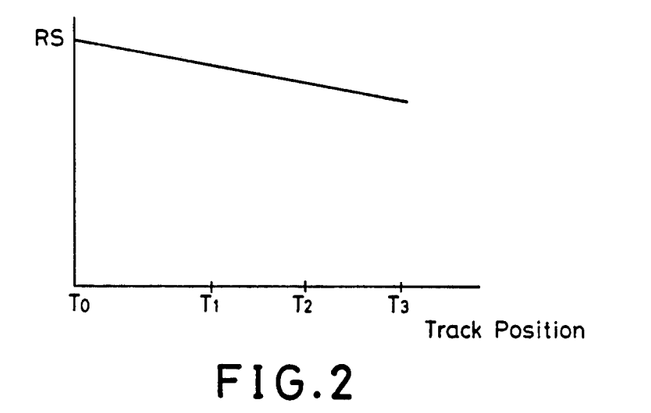
FIG. 2 is a diagram illustrating a variation in level of the reference signal in accordance with the position of the read/write head in relation to a track.
Figure 3:
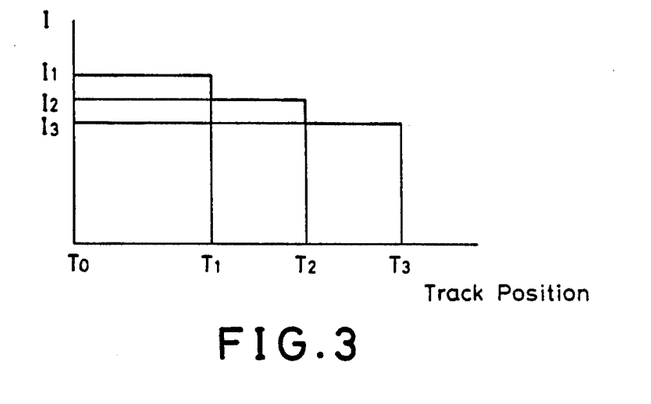
FIG. 3 is a diagram used to explain examples of the signals which are applied as a gradient determination signal to the variable ramp generator in accordance with the position of the read/write head in relation to a track.

Referring further to FIGS. 1, 2 and 3, the abovedescribed detection by using the variable ramp generator will be explained in more detail.

FIG. 1 is a plan view of a disc 1 which is securely supported by a spindle shaft 1a and rotates in the direction indicated by an arrow Q. Reference information storage regions 3 are defined partially in the circumferential direction of a plurality of tracks. Information stored in the tracks 2 and the reference information storage regions 3 are read out by a head 4 disposed at the leading end of a head arm 4a. The read out signals as to the reference information from the head 4 are amplified by a wide band amplifier 20 (FIG. 4) to obtain a reference signal RS. Levels of the reference signal RS at radial positions T0–T3 of the tracks; that is, more strictly speaking, measured values of the peak values are shown in FIG. 2. The level of the reference signal RS is the highest at the position T0 of the radially outermost track and is the lowest at the position T3 of the radially innermost track. In this embodiment, the level at the position T3 is about 75% of the level attained at the position T0.

In order to compensate for the variation in level of the reference signal RS in the range of 25%, the present invention provides a ramp generator for controlling the gradient of a ramp signal TS. Values I of constant current which are generated in the ramp generator in order to determine the gradient of the ramp signal TS are shown in FIG. 3. In this embodiment shown in FIG. 3, the constant currents I1, I2 and I3 flow at the intervals between the track positions T0 and T1; between the track positions T1 and T2; and between the track positions T2 and T3, respectively. The value of the constant current is higher at the positions of the tracks on the side of the outer periphery of the disc, so that the gradient of the ramp signal TS is steep, but the value of the constant current at the positions of the tracks on the side of the inner periphery of the disc is low, so that the gradient of the ramp signal TS is gentle. In addition, the gradient of the reference signal TS is so selected that a uniform accuracy with which an off-track amount can be detected can be obtained all over the surface of the disc regardless of the positions of the tracks thereon.

Of course, it is not necessary to change stepwise the gradient of the ramp signal TS in accordance with the positions of the tracks as shown in FIG. 3 and it is possible to continuously change the gradient of the ramp signal TS. That is, it is sufficient to vary the gradient in such a manner that an off-track amount can be detected with uniform accuracy all over the surface of the disc.

Figure 4:
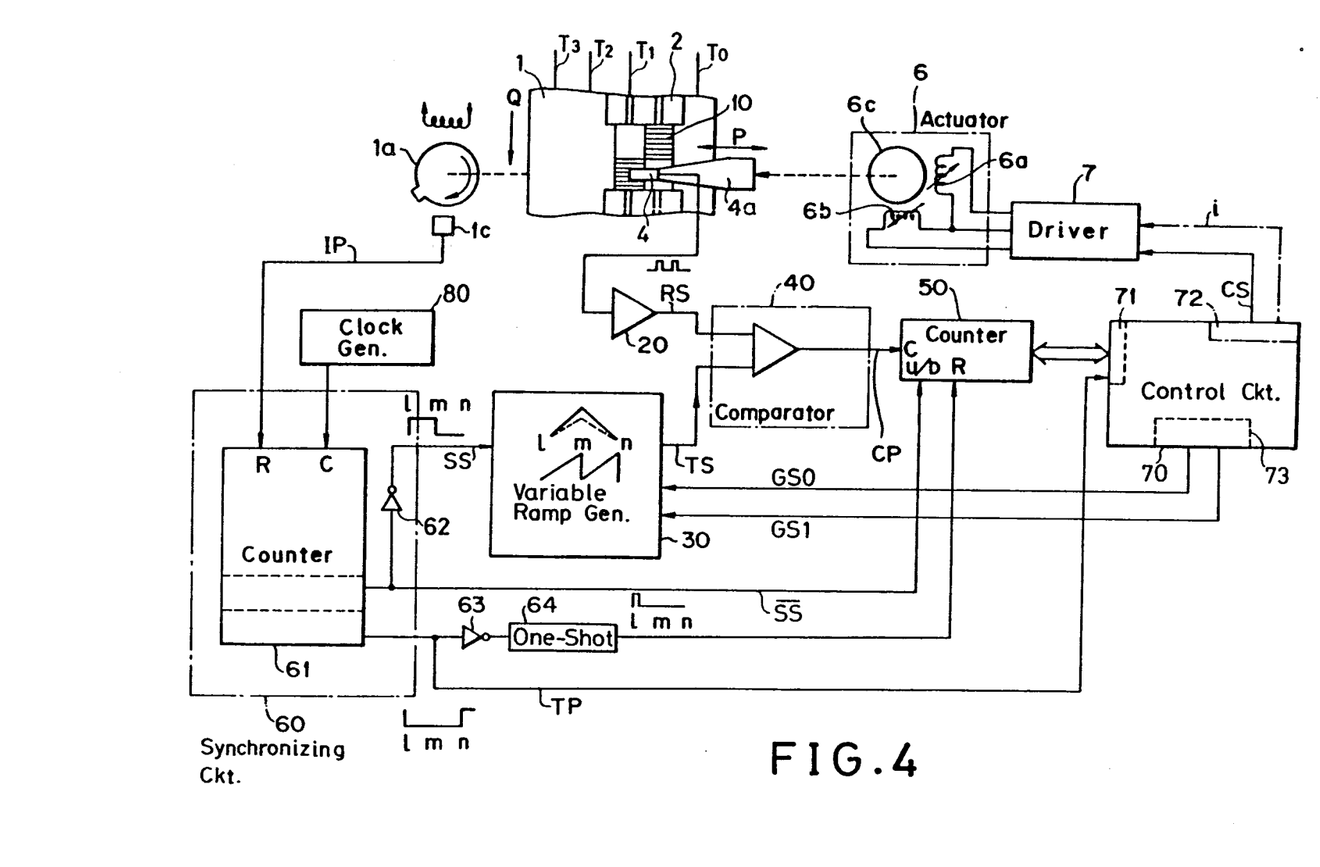
FIG. 4 is a block diagram showing an embodiment of a system for detecting an off-track amount of a head position in a disc storage unit in accordance with the present invention.

FIG. 4 shows in block diagram from an embodiment of a head-position control apparatus to which the present invention is applied.

In the upper portion in FIG. 4, a portion of the disc 1 as a recording medium is shown in a developed form. The portion has three tracks 2. Reference information 10 is so written into the disc 1 as to interrupt a portion of the tracks in the circular direction. A reference signal RS is read out from the portions having the reference information via an amplifier 20 by the head 4 to detect the position of the head 4.

As in the case of the prior art control system described above, the disc 1 is rotated at a high speed by a spindle motor 1b such as a electronic motor and the head 4 is controlled at a desired position by an actuator 6. The actuator 6 can be a multi-polar stepping motor having two-phase stator coils 6a and 6b and a rotor 6c, as shown in FIG. 4, and the rotor 6c is rotated with an accuracy less than one degree per one pulse. Furthermore, by relatively increasing or decreasing the current flowing through one or both of the coils 6a and 6b, the motor 6 functions as a torque motor so that the angular position of its rotor 6c can be finely adjusted when the rotor 6c stops.

A driver 7 generates pulses for driving the motor 6 and adjusts the two-phase current. That is, in response to an instruction designating a track number represented by "i" shown in the right portion of FIG. 4, the driver 7 shifts the head 4 to the i-th track 2.

Figure 5:
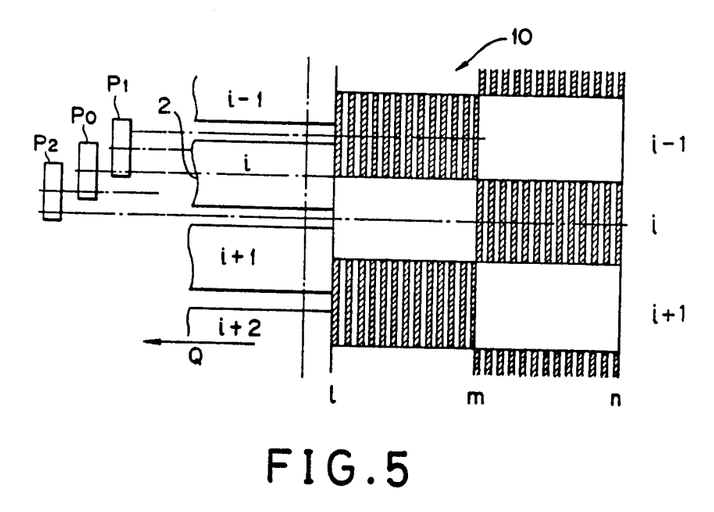
FIG. 5 is a schematic diagram showing an arrangement of reference information written in the surface of a disc.

FIG. 5 shows in detail an example of a recording format of the reference information 10. The recorded regions each having the reference information 10 are displaced in the radial direction in relation to the tracks 2 by a distance equal to one half of the pitch between two adjacent tracks 2. That is, the i-th reference information is recorded between the i-th and (i+1)-th tracks 2 and the (i−1)-th reference information is recorded between the (i−1)-th and i-th tracks 2. The reference information regions each represented by a hatched stripe pattern are alternately displaced from each other with respect to the center line m in the longitudinal direction of the tracks 2, so that the reference information regions which are adjacent to each other are staggered. Each reference information region has a pattern consisting of about one hundred N and S poles or a pattern of about one hundred "ON" and "OFF" bits. Even if the signal pattern between the leading edge 1 and the trailing edge n is repeated several times in order to ensure the accuracy in the detection of the position of the head 4, the reference information occupies only 1–2% of the whole circumference of the disc 1.

Three positions P0, P1 and P2 of the head 4 are illustrated in the left portion of FIG. 5. The position P0 is the normal position for the i-th track 2 and the position P1 is displaced upwardly from the normal position P0 and is spaced apart therefrom by a distance shorter than one half of the pitch between the two tracks, while the position P2 is displaced downwardly from the normal position P0 and is spaced apart therefrom by a distance shorter than one half of the pitch between the two tracks.

Figure 6:
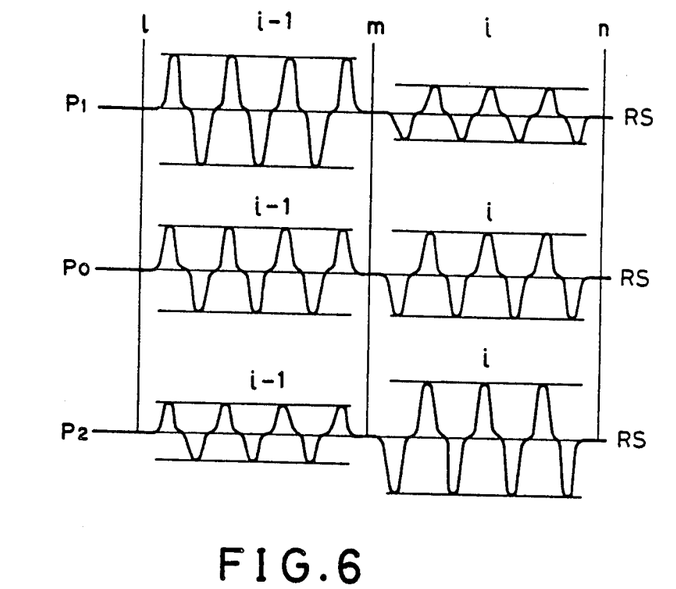
FIG. 6 illustrates waveforms of the reference signals obtained by reading the reference information in accordance with the position of the read/write head.

FIG. 6 illustrates waveforms of the reference signals RS read out from the head 4 when the head 4 is located at the positions P0–P2. The adjacent reference information regions are displaced with respect to each other as shown in FIG. 5, a read out signal corresponding to the (i−1)-th reference information is separatedly obtained during the time interval between the leading edge 1 and the center point m, while a read out signal corresponding to the i-th reference information is separately obtained during the time interval between the center point m and the trailing edge n. It is apparent from FIG. 6 that when the head 4 is at the normal position P0, the peak values of the reference signals RS corresponding to the (i−1)-th and i-th reference information regions are equal to each other. When the head 4 is at the upwardly displaced position P1, the peak values of the reference signal corresponding to the (i−1)-th reference information region are higher than those of the reference signal corresponding to the i-th reference information region. When the head 4 is at the downwardly displaced position P2, the peak values of the reference signal corresponding to the (i−1)-th reference information region are lower than those of the reference signal corresponding to the i-th reference information region.

Referring back to FIG. 4, a ramp signal generator 30 generates a ramp-shaped threshold signal TS to be compared with the reference signal RS. As shown in the block of the ramp signal generator 30, the generator 30 generates a triangular waveform which has a peak corresponding to the center m of the reference signal 10, as shown in the block for the generator 30 in FIG. 4. Alternatively, the generator 30 may generate a sawtooth waveform which is repeated periodically on both sides of the midpoint m of the sawtooth signal. The variable ramp signal generator 30 receives a gradient designation signal GS from a control circuit 70 which may be formed by a computer. In response to this signal GS, the time gradient of the ramp-shaped threshold signal TS, which is generated by the generator 30, is varied as illustrated by a broken line in the block of the generator 30. The gradient designation signal can be two-bit data GS0 and GS1 obtained from an output port 73 of the control circuit 70. A synchronizing circuit 60 generates a synchronizing signal SS, in response to which the ramp-shaped threshold signal TS is synchronized with the reference signal RS. In the first embodiment shown in FIG. 4, a so-called index pulse IP is used to generate the synchronizing signal SS.

As is well known in the art, the index pulse IP is a sync pulse in response to which data is written into or read out from the disc 1. For instance, one index pulse IP is generated at every one rotation of the disc 1 by an angular position pulse generator 1c mounted to the spindle motor 1a.

The synchronizing circuit 60 has, for instance, a counter 61 which is reset in response to the index pulse IP to start counting clock pulses from a clock generator 80. Therefore, when the synchronizing signal SS is derived from the last stage of the counter 61 through an inverter 62, this is a signal which is set in the "1" state at the leading edge 1 of the reference information and falls to the "0" state at the midpoint m of the reference information in response to the index pulse IP.

Figure 7:
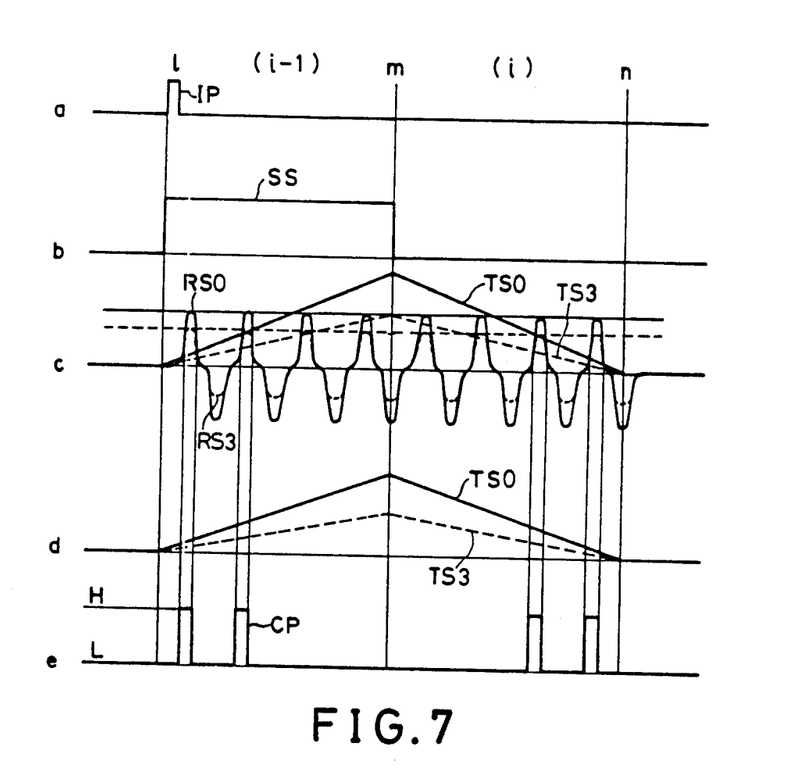
FIGS. 7 and 8 illustrate waveforms used to explain the steps for obtaining count pulses by comparing the reference signals with a ramp-shaped threshold signal.

The index pulse IP and the synchronizing signal SS have waveforms as illustrated at waveforms a and b, respectively, in FIG. 7. It is not necessary to use the index pulse IP in order to obtain the synchronizing signal SS in synchronism with the reference signal RS in the synchronizing circuit 60 and alternatively specific information for providing a reference pulse can be written into the reference information 10 for the purpose of synchronization.

The ramp signal TS thus generated is used as a threshold value and the reference signal RS is evaluated or compared with the ramp signal TS by a comparator 40. This process is illustrated by the waveforms c, d and e in FIG. 7. The reference signal RS0 whose waveform is shown at c in FIG. 7 is obtained when the head 4 is at the most outward track position T0 and its normal position P0 (See FIG. 5), and the peak values of the reference signal RS0 with respect to the (i−1)-th reference information are equal to those of the reference signal RS0 with respect to the i-th reference information. The reference signal RS0 is compared as shown at c in FIG. 7 with the ramp signal TS0 whose waveform is shown at d in FIG. 7. As a result, the comparator 40 generates the pulses CP as shown at e in FIG. 7. The number of count pulses CP is equal to the number of times that the peaks of the reference signal RS exceed the ramp signal TS. That is, in FIG. 7, since the peak values of the reference signals RS obtained from the two adjacent reference information regions are equal to each other, two count pulses CP are obtained from each of the reference information regions.

On the other hand, when the head 4 is positioned at the normal position P0 of the most inward track position T3 of the disc 1, peak values in the corresponding reference signal RS3 are identical to each other with respect to adjacent reference information regions. The magnitude of the peak value, however, is lower than that of the reference signal RS0 when the head 4 is positioned at the most outward track position T0. Accordingly, if the peak value for the reference signal RS3 is compared with the above-mentioned ramp-shaped threshold signal TS0, the number of the count pulses CP is decreased. With this in view, the variable ramp signal generator 30 generates a ramp-shaped signal TS3 having a gradient smaller than that of the ramp-shaped signal TS0 as a ramp-shaped signal to be compared with the reference signal RS3. This processing ensures that the number of the count pulses CP (two pulses in this case shown in FIG. 7) is not varied even if the peak value of the reference signal is varied.

Figure 8:
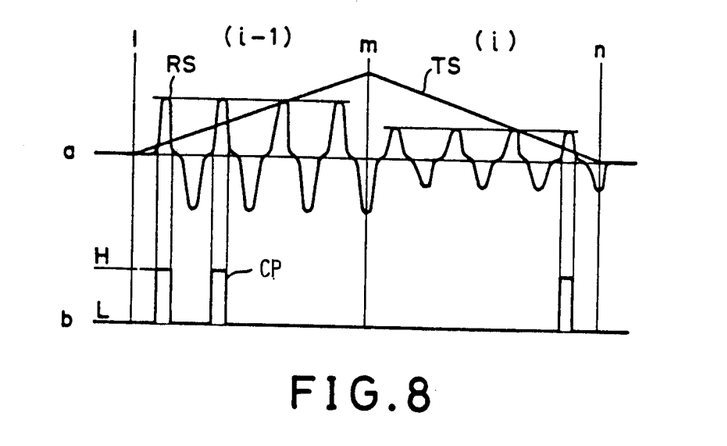

FIG. 8 illustrates a manner of comparison of the reference signal RS with the ramp-shaped signal when the head 4 is, for instance, at the above-described position P1 deviated from the normal track position P0. The peak values of the two reference signals RS from the (i−1)-th and i-th reference information regions are different from each other in this case, so that the numbers of the count pulses CP for the adjacent reference information regions are different from each other. As a consequence, as illustrated at the waveform b in FIG. 8, the numbers of the count pulses CP for the (i−1)-th and i-th reference information regions are "2" and "1", respectively. This difference of the numbers indicates a deviation of the position of the head 4 from the normal position P0. Further, the gradient of the ramp-shaped signal TS is varied in accordance with the track positions T0–T3 of the head 4 in this case illustrated in FIG. 8 in the same way as the case shown in FIG. 7.

Referring back again to FIG. 4, a counter 50 is a circuit which counts the count pulses CP from the adjacent reference information regions to obtain the difference between the count pulses CP from one reference information region and the count pulses CP from the other reference information region. In the first embodiment, the counter 50 may consist of one up/down counter and its count value is reset or cleared in synchronism with the index pulse IP. In order to reset the counter 50, a trigger pulse TP is derived from the output stage of the counter 61 in the synchronizing circuit 60, which is next to a counting stage from which the synchronizing pulse SS is derived. The trigger pulse TP is converted into a reset pulse in synchronism with the index pulse IP through an inverter 63 and a one-shot circuit 64. The reset pulse thus obtained is applied to the reset terminal of the up/down counter 50.

A complement pulse $\overline{SS}$ which has a level opposite to that of the synchronizing pulse SS is applied to an up-/down operation designation input terminal U/D of the counter 50 and the up/down counting mode is switched at a time point corresponding to the midpoint m of the reference information 10. Therefore, in synchronism with the index pulse IP, the up/down counter 50 starts counting up the count pulses CP at a time point corresponding to the leading edge 1 of the reference information 10 and then is switched to count down the count pulses CP at a time point corresponding to the midpoint m of the reference information 10. As a consequence, at a time point corresponding to the trailing edge ZaN of the reference information 10, the difference between the number of count pulses CP obtained from the two adjacent reference information regions is stored as a count value in the counter 50.

The output from the counter 50 is applied in synchronism with the rise of the next trigger pulse TP to a buffer 71 in a control circuit 70.

The control circuit 70 may comprise, for instance, a microcomputer. In response to the output from the counter 50 representing a deviation of the head 4 from its normal position P0, the control circuit 70 applies a head position correction command CS to the driver 7 via an output port 72.

In response to the correction command CS, the driver 7 controls, for example, the currents distributed to the stator coils 6a and 6b of the actuator 6, so that the head 4 is finely adjusted to its normal position P0. When the actuator 6 is a stepping motor as is the case of the first embodiment, the actuator 6 is used as a torque motor so as to perform the above-described fine adjustment.

Each of the two adjacent reference information regions has about 100 repetitive patterns, each consisting of two alternately arranged different states, so that when the head 4 is substantially deviated from its normal position P0, a count value corresponding to a difference of about several tens of pulses is detected as a deviation and is applied from the counter 50 to the control circuit 70. Even when the deviation of the head 4 from its normal position P0 is small, a count value corresponding to a difference of a few pulses is obtained as the amount of the position deviation.

Figure 9:
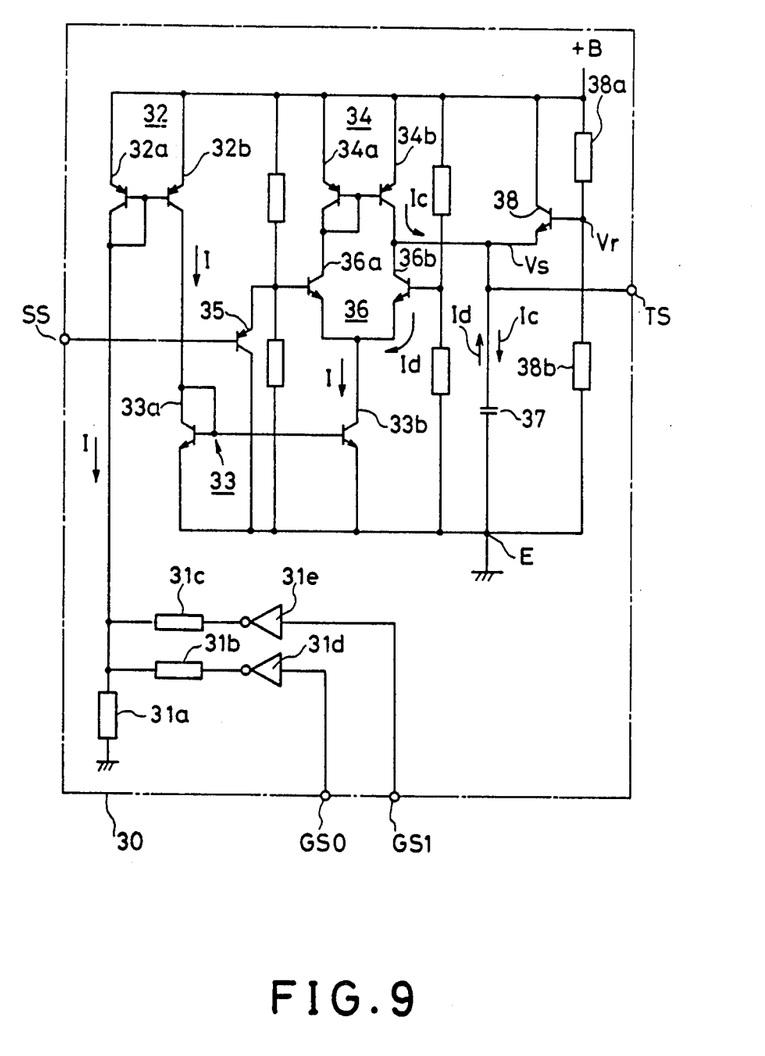
FIG. 9 is a circuit diagram showing an embodiment of a variable ramp generator.

Next, a specific emodiment of the variable ramp signal generator will be explained in detail with reference to FIG. 9. In FIG. 9, various circuit components within the block defined by the dash-and-dotted lines constitute the variable ramp generator 30 which generates a triangular waveform ramp-shaped signal TS in response to and in synchronism with the sync signal SS. The signal TS has a gradient determined by the gradient designation signals GS0 and GS1. The gradient designation signals GS0 and GS1 select the constant currents I1, I2 and I3 shown in FIG. 3. These constant currents I1, I2 and I3 charge or discharge the capacitor 37, whose capacitor voltage becomes the ramp signal TS, thereby giving a predetermined gradient to the ramp signal TS.

In order to generate the constant currents I1, I2 and I3, there are provided resistors 31a, 31b and 31c and inverters 31d and 31e each having an open collector arrangement. One end of the resistor 31a, one end of the resistor 31b and one end of the resistor 31c are connected in common, while the other end of the resistor 31a is grounded and the other ends of the resistors 31b and 31c are connected to the output terminals, respectively, of the inverters 31d and 31e.

When both the gradient designation signals GS0 and GS1 are in the "LOW" state, while both the open collector outputs of the inverters 31d and 31e are in the "HIGH" state, the current I from the constant voltage power source +B mainly flows through the resistor 31a and the magnitude of this current I corresponds to the constant current I3 shown in FIG. 3. When the gradient designation signal GS0 rises to the "HIGH" state, the output from the inverter 31d becomes ground potential and the current I flows through the resistors 31a and 31b in parallel. As a result, the magnitude of the current I is increased as shown by the constant current I2 in FIG. 3.

In like manner, when both the gradient designation signals GS0 and GS1 rise to the "HIGH" state, the current I flows through the resistors 31a, 31b and 31c, so that the constant current I1 having a higher magnitude can be obtained. That is, depending upon whether the gradient designation signals GS0 and GS1 are in the "HIGH" or "LOW" state, the constant current is varied stepwise as indicated by I1, I2 and I3 in FIG. 3. Further, a desired track is designated from a host system and the control circuit 70 stores this designation. The control circuit 70 also stores the present track position. Thus, according to these data, the control circuit 70 determines the combination of the signals GS0 and GS1.

The constant current I thus controlled flows through one transistor 32a of a current mirror circuit 32, so that the same constant current I flows through the other transistor 32b thereof. The constant current I also flows through one transistor 33a of another current mirror circuit 33, so that the same constant current I also flows through the other transistor 33b. The collector of the other transistor 33b is connected to a differential circuit 36. The differential circuit 36 is a switching circuit in which two transistors 36a and 36b are alternately turned on and off. The "ON" and "OFF" states of the transistors 36a and 36b are determined by a transistor 35 which receives the sync signal SS. That is, when the sync signal SS rises to the "HIGH" state, the transistor 35 is turned on, so that the transistor 36a in the differential circuit 36 is turned on, while the transistor 36b is turned off.

Under these conditions, the constant current flowing through the other transistor 33b of the current mirror circuit 33 flows through the capacitor 37 and the transistor 36b in the differential circuit 36 and then is discharged as the discharge current Id from the capacitor 37. That is, from the capacitor 37 the discharge current Id equal in magnitude to the constant charging current I is discharged from a point in time at which the sync signal SS drops to the "LOW" state. As a result, the ramp signal TS linearly falls with a predetermined gradient which is determined by the constant current I. In this manner, the variable ramp generator 30 generates a triangular waveform ramp-shaped signal TS in synchronism with the sync signal SS.

A transistor 38 which is connected to the capacitor 37 functions to determine the potential at the output terminal of the variable ramp generator 30 during the period except the time interval during which the ramp signal TS is generated. The base potential Vr of the transistor 38 is clamped to a value which in turn is determined by a voltage division ratio obtained by a pair of resistors 38a and 38b, but the transistor 38 is kept turned off during the time interval during which the ramp signal TS is generated. When the ramp signal TS drops slightly below the base potential Vr because of the discharge of the capacitor 37, the transistor 38 is turned on to maintain the output terminal potential of the variable ramp generator 30 at a predetermined level Vs, which is equal to a value obtained by subtracting the base-emitter voltage drop Vbe of the transistor 38 from the base potential Vr. The predetermined value Vs is maintained during the whole period except the period that no ramp signal TS is generated. Consequently, the transistor 36a is maintained in the "OFF" state, while the transistor 36b is maintained in the "ON" state in the differential circuit, as is well known in the art.

As is clear from the foregoing description, according to the present invention, the gradient of the ramp signal TS is varied in accordance with the radial position of a track on the surface of the disc, so that an off-track amount can be detected with a high degree of accuracy, while ensuring the feature that the reference information signals read out from the adjacent reference information storage regions can be distinctly separated in time from each other.

In addition to the above-described embodiments, various modifications can be made in accordance with the present invention. For instance, FIG. 9 shows only one embodiment of the circuit construction of the variable ramp generator 30 and depending upon the waveform of the ramp signal TS to be generated and upon then accuracy, various circuits may be employed. Furthermore, so far the gradient designation signals GS0 and GS1 have been described as being applied from the control circuit 70 or a computer to the variable ramp generator 30. This is only because in general the control circuit 70 always detects the position of the track 4 in relation to a specific track, so that it is convenient to give the gradient designation signals from the control circuit 70. As is well known to those skilled in the art, there has been devised and demonstrated means for precisely detecting the present position of the head 4 in relation to a specific track. When such means is utilized, it is preferable that the gradient designation signals GS0 and GS1 be applied from the means to the variable ramp generator 30.

As described above, according to the present invention, an off-track amount of the read/write head from its normal position can be detected with a desired degree of accuracy by selecting the number of repetitive patterns in a reference information region and in addition the repetitive patterns can be made very simple. Therefore, even if the repetitive rate is increased drastically so as to improve the accuracy with which an off-track amount is detected, there is no fear that the reference information storage region must be increased in area. Thus, the present invention can be advantageously applied to the so-called data-surface-servo type disc storage unit.

In addition, according to the present invention, the variable ramp generator is so designed and constructed that the ramp signal has a gradient in accordance with the radial position of a track on the surface of the disc. Therefore, an off-track amount can be always detected with a high degree of accuracy regardless of the radial position of the head.

After the ramp signal has been compared with the reference signal obtained by reading out the reference information region, the signal is almost converted into the form of a digital signal. As a result, as compared with the prior art techniques, the circuit for evaluating the digitalized signals can be considerably simplified and the fear of the occurrence of evaluation errors can be substantially eliminated.

What is claimed is:

1. A system for detecting an off-track amount of a head position in a disc storage unit in which information is written into and/or read out from a plurality of recording tracks defined on a surface of a disc as a recording medium by a movable transducer head, and repetitive pattern signals, which are deviated from each other in the longitudinal direction of said tracks in adjacent reference information regions, and which are written into regions corresponding to said plurality of tracks as reference information, respectively, of said disc are read out by said head, so that an off-track amount of the present position of said head from the normal position of a desired track is detected, comprising:
   means for reading out two repetitive pattern signals from two adjacent reference information regions by said head;
   means for generating a ramp-shaped signal in synchronism with a timing signal such that said repetitive pattern signals are read out;
   means for varying a gradient of said ramp-shaped signal in accordance with the position of said desired track on the surface of said disc;
   means for comparing said two repetitive pattern signals read out from said two adjacent reference information regions with said ramp-shaped signal as a threshold signal value to obtain two repetitive pattern signals which cross said threshold value;
   means for counting the numbers of said two repetitive pattern signals which cross said threshold value;
   means for obtaining the difference between counted numbers of said repetitive pattern signals crossing the threshold value; and
   means for obtaining an off-track amount of a position of said head from said desired track in response to said difference between the counted numbers.

2. A system as claimed in claim 1, wherein said ramp-shaped signal varies linearly between the leading edge and the center of said reference information region and varies linearly in the opposite direction between said center and the trailing edge thereof.

3. A system as claimed in claim 1, wherein said ramp-shaped signal has a sawtooth wave form which varies in the same manner between the leading edge and the center of said reference information region and between said center and the trailing edge thereof.

4. A system as claimed in claim 1, further comprising means for generating index pulses for attaining the synchronization for writing and/or reading information onto and/or from said disc, so that in response to said index pulses, the timing for generating said ramp-shaped signal is determined.

5. A system as claimed in claim 4, further comprising a counter which is reset in response to said index pulses to count clock pulses, said timing being determined in response to an output from said counter.

6. A system as claimed in claim 1, said counting means and said means for obtaining the difference are formed by an up/down counter.

7. A system as claimed in claim 6, further comprising means for generating index pulses for attaining the synchronization for writing and/or reading information onto and/or from said disc, so that in response to said index pulses, said up/down counter is reset; and a counter which is reset in response to said index pulses to count clock pulses, and wherein in response to the output from said counter, the counting direction of said up/down counter is selected and said up/down counter counts the comparison outputs from said comparing means.

8. A system as claimed in claim 1, wherein in accordance with the position of a track, the gradient of said ramp-shaped signal is varied stepwise.

9. A system as claimed in claim 1, wherein in accordance with the position of a track, the gradient of said ramp-shaped signal is varied continuously.

10. A method for detecting an off-track amount of a head position in a disc storage unit in which information is written into and/or read out from a plurality of recording tracks defined on a surface of a disc as a recording medium by a movable transducer head, and reference information written into regions corresponding to said plurality of tracks, respectively, of said disc are read out by said head, so that an off-track amount of the present position of said head from the normal position of a desired track is detected, said method comprising the steps of:

writing, as said reference information, a repetitive pattern in each of said reference information regions in such a way that said repetitive patterns are deviated from each other in the longitudinal direction of the tracks in adjacent reference information regions;

generating a ramp-shaped signal whose gradient is varied in accordance with the position of a desired track on th surface of said disc in synchronism with reading of said reference information from said two adjacent reference information regions by said head;

counting the numbers of said repetitive pattern signals which are read out from said two adjacent reference information regions and which cross said ramp-shaped signal as a threshold value; and detecting an off-track amount of a position of said head in relation to a desired track in accordance with the difference between counted numbers of said repetitive pattern signals crossing said threshold value.

11. A method as claimed in claim 10, wherein said ramp-shaped signal varies linearly between the leading edge and the center of said reference information region and varies linearly in the opposite direction between said center and the trailing edge thereof.

12. A method as claimed in claim 10, wherein said ramp-shaped signal has a sawtooth wave form which varies in the same manner between the leading edge and the center of said reference information region and between said center and the trailing edge thereof.

13. A method as claimed in claim 10, wherein in accordance with the position of a track, the gradient of said ramp-shaped signal is varied stepwise.

14. A method as claimed in claim 10, wherein in accordance with the position of a track, the gradient of said ramp-shaped signal is varied continuously.

* * * * *